US012762498B2

(12) United States Patent
Seck et al.

(10) Patent No.: US 12,762,498 B2
(45) Date of Patent: Oct. 13, 2026

(54) MULTI-DIMENSIONAL SAFETY MODEL

(71) Applicant: Capital One Services, LLC, McLean, VA (US)

(72) Inventors: Mohamed Seck, Aubrey, TX (US); Shanice Brodie, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 68 days.

(21) Appl. No.: 18/784,229

(22) Filed: Jul. 25, 2024

(65) Prior Publication Data

US 2026/0030584 A1 Jan. 29, 2026

(51) Int. Cl.
*G06Q 10/0639* (2023.01)
*G06Q 50/20* (2012.01)

(52) U.S. Cl.
CPC ....... *G06Q 10/06393* (2013.01); *G06Q 50/20* (2013.01)

(58) Field of Classification Search
CPC ......................... G06Q 10/06393; G06Q 50/20
USPC ........................................................ 705/3–44
See application file for complete search history.

(56) References Cited

U.S. PATENT DOCUMENTS 10,445,672 B2 * 10/2019 Renfroe ............... G06Q 10/087
11,900,778 B1 * 2/2024 Scully, Jr. ............ G08B 25/006
2013/0132287 A1 * 5/2013 Yao ........................ G06Q 30/02
705/306
2019/0266526 A1 * 8/2019 Knuff ................. G06Q 10/0635
2022/0368665 A1 * 11/2022 Walters ................. H04L 51/224
2023/0119132 A1 * 4/2023 Cebulski ............ G06V 10/7715
382/103
2023/0260380 A1 * 8/2023 Timco .................... G08B 21/02
340/573.1

FOREIGN PATENT DOCUMENTS

WO WO-2021033061 A1 * 2/2021 ............. G06V 20/80
WO WO-2023283231 A1 * 1/2023 ............. G06V 20/39

OTHER PUBLICATIONS

Leyla et al "Developing a safety indicator to measure the safety level during design for safety", Safety Science, Dec. 2015, pp. 252-263 (Year: 2015).*

(Continued)

*Primary Examiner* — Romain Jeanty
(74) *Attorney, Agent, or Firm* — Harrity & Harrity, LLP

(57) ABSTRACT

In some implementations, an analysis system may receive, from a user device, an indication of a property. The analysis system may map the indication of the property to a plurality of possible locations of a plurality of possible schools associated with the property. The analysis system may output, to the user device, an indication of the plurality of possible locations. The analysis system may receive, from the user device, an indication of a selected location from the plurality of possible locations. The analysis system may provide a representation of the selected location to the machine learning model in order to receive the multi-dimensional safety indicator. The multi-dimensional safety indicator may include a plurality of scores associated with a respective plurality of dimensions. The analysis system may output, to the user device, a data structure encoding the multi-dimensional safety indicator.

20 Claims, 10 Drawing Sheets

(56) References Cited

OTHER PUBLICATIONS

Ronet et al (Predicting Feelings of School Safety for Lower, Middle, and Upper School Students: A Gender Specific Analysis), Dec. 2011, Applied Psychology in Criminal Justice, pp. 59-76 (Year: 2011).*

* cited by examiner

100

MULTI-DIMENSIONAL SAFETY MODEL

BACKGROUND

Evaluation of schools (or school systems) may be performed using an automated model. Generally, the automated model may use academic information associated with a school (or a school system) in order to determine a quality score for the school (or the school system).

SUMMARY

Some implementations described herein relate to a system for using a machine learning model to determine a multi-dimensional safety indicator. The system may include one or more memories and one or more processors communicatively coupled to the one or more memories. The one or more processors may be configured to receive, from a user device, an indication of a property. The one or more processors may be configured to determine, using the indication of the property, a location of a school associated with the property. The one or more processors may be configured to receive, from a first data source, statistical information associated with the location. The one or more processors may be configured to receive, from a second data source, a set of feedback associated with the location, where the set of feedback originated from a set of verified sources. The one or more processors may be configured to receive, from a third data source, background information associated with a set of staff for the location. The one or more processors may be configured to provide the statistical information, the set of feedback, and the background information to the machine learning model in order to receive the multi-dimensional safety indicator, wherein the multi-dimensional safety indicator comprises a plurality of scores associated with a respective plurality of dimensions. The one or more processors may be configured to output, to the user device, instructions for a user interface (UI) including a representation of the multi-dimensional safety indicator.

Some implementations described herein relate to a method of using a machine learning model to determine a multi-dimensional safety indicator. The method may include receiving, at an analysis system and from a user device, an indication of a property. The method may include mapping, by the analysis system, the indication of the property to a plurality of possible locations of a plurality of possible schools associated with the property. The method may include outputting, from the analysis system and to the user device, an indication of the plurality of possible locations. The method may include receiving, at the analysis system and from the user device, an indication of a selected location from the plurality of possible locations. The method may include providing a representation of the selected location to the machine learning model in order to receive the multi-dimensional safety indicator, wherein the multi-dimensional safety indicator comprises a plurality of scores associated with a respective plurality of dimensions. The method may include outputting, from the analysis system and to the user device, a data structure encoding the multi-dimensional safety indicator.

Some implementations described herein relate to a non-transitory computer-readable medium that stores a set of instructions for receiving a multi-dimensional safety indicator determined by a machine learning model. The set of instructions, when executed by one or more processors of a device, may cause the device to transmit, to an analysis system, an indication of a property. The set of instructions, when executed by one or more processors of the device, may cause the device to receive, from the analysis system and in response to the indication of the property, an indication of a plurality of possible locations of a plurality of possible schools associated with the property. The set of instructions, when executed by one or more processors of the device, may cause the device to transmit, to the analysis system, an indication of a selected location from the plurality of possible locations. The set of instructions, when executed by one or more processors of the device, may cause the device to receive, from the analysis system and in response to the indication of the selected location, a data structure encoding the multi-dimensional safety indicator associated with the selected location, wherein the multi-dimensional safety indicator comprises a plurality of scores that were determined by the machine learning model and are associated with a respective plurality of dimensions.

DETAILED DESCRIPTION

The following detailed description of example implementations refers to the accompanying drawings. The same reference numbers in different drawings may identify the same or similar elements.

Evaluation of schools (or school systems) may be performed automatically. For example, a model may use academic information associated with a school (or a school system) in order to determine a quality score for the school (or the school system). However, accuracy of the model is limited both by input and by output (e.g., outputting a single score or letter grade for the school or the school system).

Additionally, the model is generally separate from a decision-making system. For example, a decision or valuation for a property is calculated separately from the quality score for a school (or a school system) associated with the property. As a result, accuracy of the decision or valuation is reduced.

Some implementations described herein enable training and use of a machine learning model that produces a multi-dimensional safety indicator for a school (or a school system). For example, the machine learning model may accept more input (e.g., statistical information, a set of feedback, and background information, among other examples) in order to increase accuracy. As a result, the machine learning model generates more accurate output (e.g., along a plurality of dimensions, such as an academic dimension, a social safety dimension, and a staff safety dimension, among other examples). Additionally, some implementations described herein enable connection of the machine learning model to a decision-making system for the property. As a result, a decision or a valuation for the property is more accurate because the decision-making system uses the multi-dimensional safety indicator from the machine learning model.

FIGS. 1A-1D are diagrams of an example 100 associated with applying a multi-dimensional safety model. As shown in FIGS. 1A-1D, example 100 includes a user device, an analysis system, a set of data sources, and a machine learning (ML) model (e.g., provided by an ML host). These devices are described in more detail in connection with FIGS. 3 and 4.

Figure 1A:
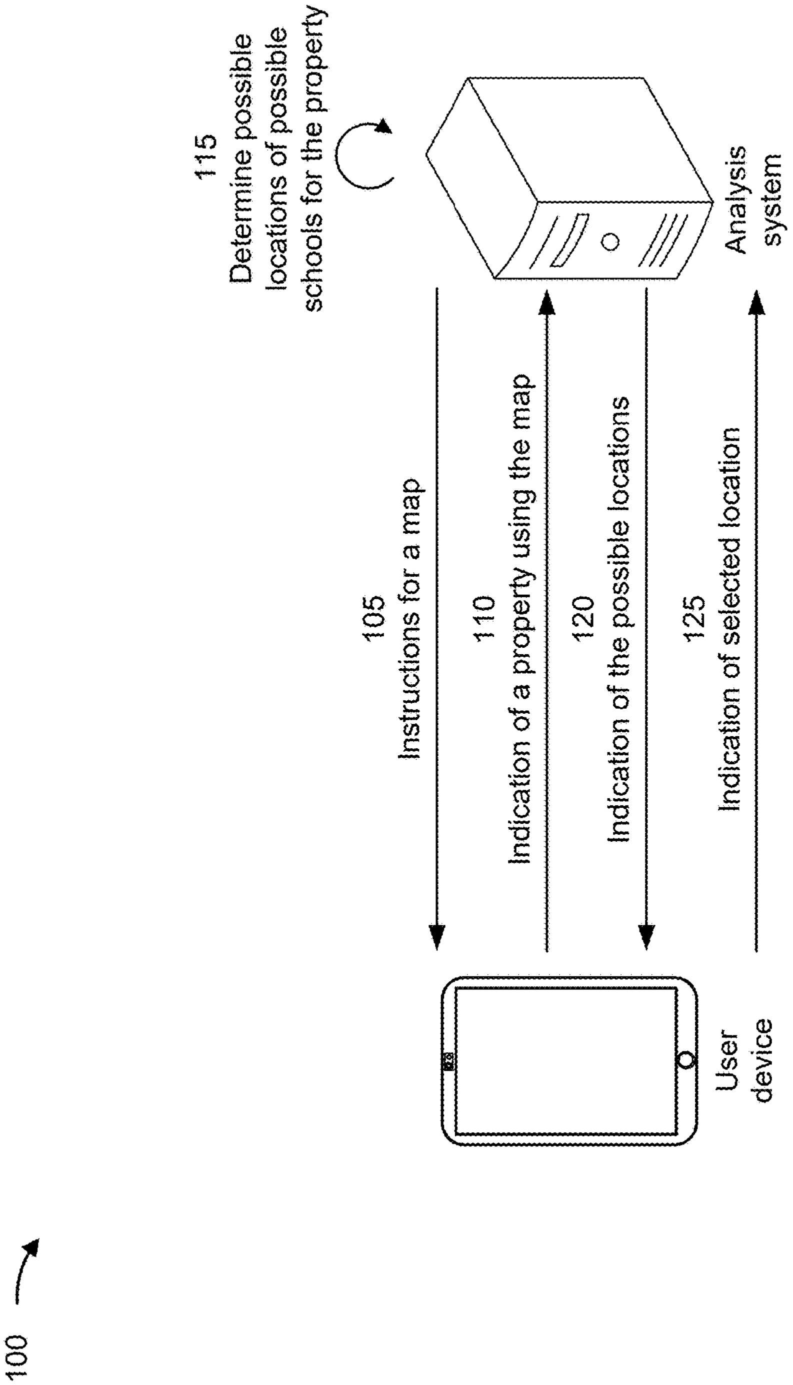
FIGS. 1A-1D are diagrams of an example implementation relating to applying a multi-dimensional safety model, in accordance with some embodiments of the present disclosure.

As shown in FIG. 1A and by reference number 105, the analysis system may transmit, and the user device may receive, instructions for a map of a geographic area. The user device may therefore output a representation of the map to a user (e.g., via an output component of the user device). The map may be based on a default location (e.g., the default location may be a focal point of the map) or may be based on a location from the user device (e.g., a zip code or a city and state, among other examples).

In some implementations, the user device may transmit, and the analysis system may receive, a request (e.g., a hypertext transfer protocol (HTTP) request, a file transfer protocol (FTP) request, and/or an application programming interface (API) call) for the map. Therefore, the analysis system may transmit, and the user device may receive, the instructions for the map in response to the request. A user of the user device may provide input (e.g., using an input component of the user device) that triggers the user device to transmit the request. For example, a web browser (and/or another application executed by the user device) may navigate to a website controlled by (or at least associated with) the quality checker and may output a user interface (UI) (e.g., using an output component of the user device) to the user. Therefore, the user may interact with the UI to provide the input that triggers the user device to transmit the request. In another example, the user may provide the input using a command line, a bash shell, or another type of text interface. In some implementations, the request may include an indication of the location on which the map is based, as described above.

As shown by reference number 110, the user device may transmit, and the analysis system may receive, an indication of a property using the map. In some implementations, the user device may detect an interaction (e.g., using an input component of the user device) with the representation of the map by the user. Accordingly, the user device may transmit the indication of the property based on the interaction. For example, the user device may transmit the indication of the property in response to the interaction. Additionally, or alternatively, the user device may transmit an indication of the interaction as the indication of the property. Additionally, or alternatively, the user device may determine the property based on the interaction (e.g., by mapping a pixel location associated with the interaction to a location of the property).

Although the example 100 is described in connection with the map, other examples may include the user device transmitting the indication of the property without outputting a representation of the map. For example, the indication of the property may be an address and/or a set of coordinates (e.g., using a geographic coordinate system (GCS) or another type of coordinate system), among other examples.

As shown by reference number 115, the analysis system may determine a plurality of possible locations (of a plurality of possible schools) for the property. The analysis system may map the indication of the property to the plurality of possible locations. For example, the analysis system may use a data structure that stores property indications in association with possible location indications (of possible schools). Additionally, or alternatively, the analysis system may transmit a query, indicating the location of the property, to a database, and the analysis system may receive a response, to the query, indicating the plurality of possible locations. The database may store indications of property locations in association with indications of possible locations (of possible schools).

As shown by reference number 120, the analysis system may output an indication of the plurality of possible locations. For example, the analysis system may transmit, and the user device may receive, instructions for a UI indicating the plurality of possible locations. The user device may therefore output the UI to the user (e.g., via an output component of the user device). For example, the UI may include a drop-down list, a listbox, or a set of radio buttons, among other examples.

As shown by reference number 125, the user device may transmit, and the analysis system may receive, an indication of a selected location (from the plurality of possible locations). In some implementations, the user device may detect an interaction (e.g., using an input component of the user device) with the UI indicating the plurality of possible locations. Accordingly, the user device may transmit the indication of the selected location based on the interaction. For example, the user device may transmit the indication of the selected location in response to the interaction. Additionally, or alternatively, the user device may transmit an indication of the interaction as the indication of the selected location. Additionally, or alternatively, the user device may determine the selected location based on the interaction (e.g., by mapping a pixel location associated with the interaction to the selected location).

Although the example 100 is described in connection with the plurality of possible locations, other examples may include the analysis system determining a location of a school associated with the property. For example, the analysis system may use a data structure that stores locations of properties in association with locations of schools. Additionally, or alternatively, the analysis system may transmit a query, indicating the location of the property, to a database, and the analysis system may receive a response, to the query, indicating the location of the school. Therefore, the analysis system and the user device may refrain from performing operations described in connection with reference numbers 120 and 125.

Figure 1B:
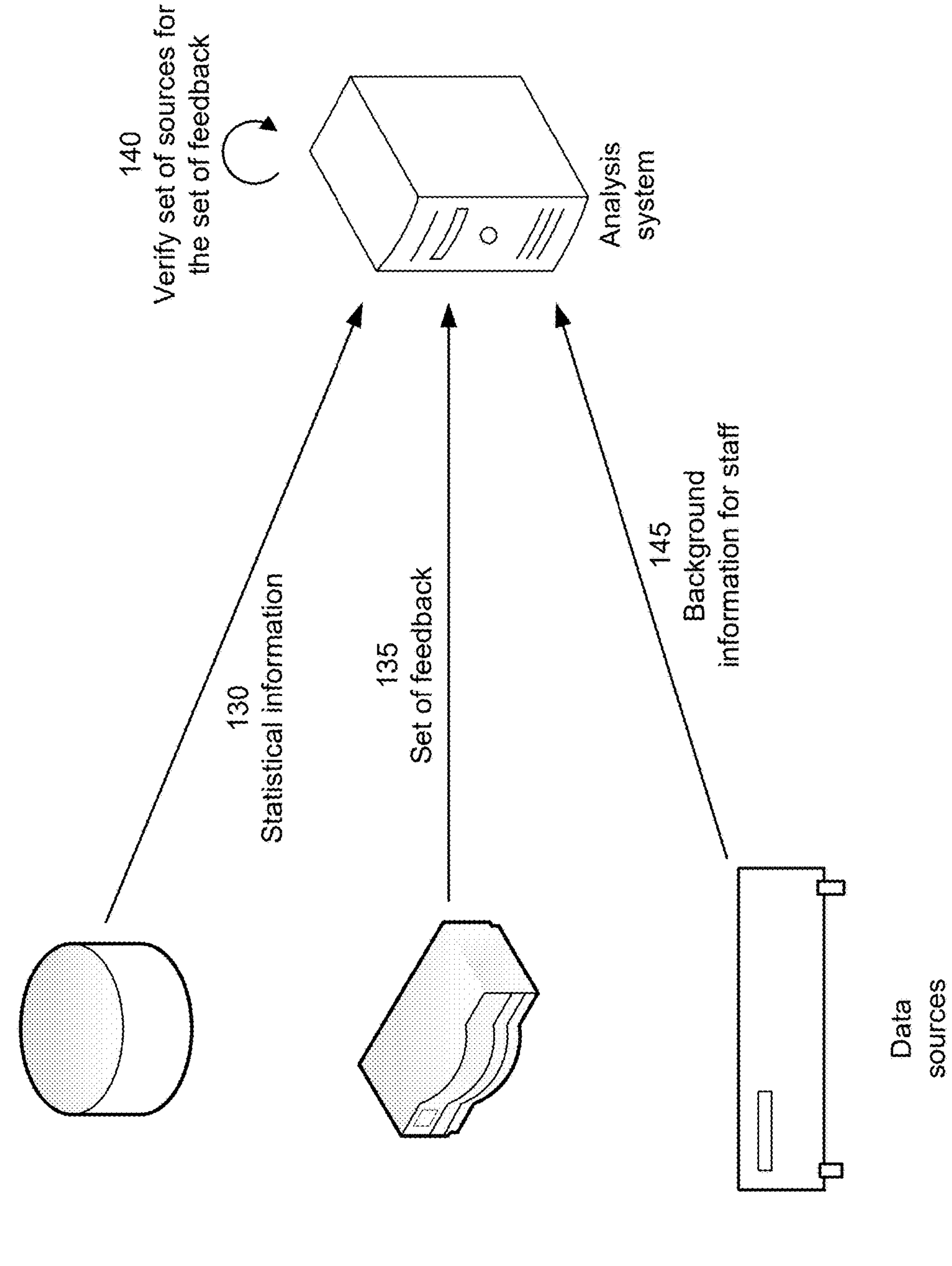

As shown in FIG. 1B and by reference number 130, a first data source (in the set of data sources) may transmit, and the analysis system may receive, statistical information (associated with the selected location). The statistical information may include academic information (e.g., a grade point average (GPA) statistic, a graduation rate, a student-to-teacher ratio, a quantity of honors classes, and/or a quantity of advanced placement (AP) or international baccalaureate (IB) classes, among other examples). The first data source may be a database hosted by (or at least associated with) the possible location or may be part of an intermediate system (e.g., a data scraper or another type of data aggregator).

In some implementations, the analysis system may transmit, and the first data source may receive, a request for the statistical information. The request may include an HTTP request, an FTP request, an API call, a structured query language (SQL) query, and/or a NoSQL query. The request may include (e.g., in a header and/or as an argument) an indication of the possible location. Accordingly, the first data source may retrieve the statistic information based on the indication of the possible location. For example, the first data source may extract the statistical information from a larger data structure based on the statistical information being associated with the possible location. The first data source may transmit, and the analysis system may receive, the statistical information in response to the request from the analysis system.

As shown by reference number 135, a second data source (in the set of data sources) may transmit, and the analysis system may receive, a set of feedback (associated with the selected location). The set of feedback may include quantitative feedback (e.g., star ratings, rankings from 1 to 5, and/or letter grades, among other examples) and/or qualitative feedback (e.g., text from parental reviews, text from disciplinary incident reports, and/or text from staff reviews, among other examples). The second data source may be a database hosted by (or at least associated with) the possible location or may be part of an intermediate system (e.g., a data scraper or another type of data aggregator).

In some implementations, the analysis system may transmit, and the second data source may receive, a request for the set of feedback. The request may include an HTTP request, an FTP request, an API call, an SQL query, and/or a NoSQL query. The request may include (e.g., in a header and/or as an argument) an indication of the possible location. Accordingly, the second data source may retrieve the set of feedback based on the indication of the possible location. For example, the second data source may extract the set of feedback from a feedback storage based on the set of feedback being associated with the possible location. The second data source may transmit, and the analysis system may receive, the statistical information in response to the request from the analysis system.

The set of feedback may have originated from a set of verified sources. Accordingly, as shown by reference number 140, the analysis system may verify the set of sources for the set of feedback. In one example, the analysis system may transmit a query, indicating the set of sources associated with the set of feedback, to a database, and the analysis system may receive a response, to the query, indicating that the set of sources are verified. The database may store names (or other indications) of parents with students enrolled at the school, such that the database may return an indication that a source is verified based on the source being a parent with a student (or students) enrolled at the school. In another example, each feedback, in the set of feedback, may include an indication of verification for a corresponding source in the set of verified sources. Therefore, the analysis system may verify the set of feedback based on indications of verifications. For example, the analysis system may discard any feedback not associated with an indication of verification.

As shown by reference number 145, a third data source (in the set of data sources) may transmit, and the analysis system may receive, background information associated with a set of staff for the selected location. The background information may include background check results, criminal and arrest histories, and/or possible civil lawsuit indications, among other examples. The third data source may be a database hosted by (or at least associated with) the possible location or may be part of an intermediate system (e.g., a data scraper or another type of data aggregator).

In some implementations, the analysis system may transmit, and the second data source may receive, a request for the set of feedback. The request may include an HTTP request, an FTP request, an API call, an SQL query, and/or a NoSQL query. The request may include (e.g., in a header and/or as an argument) an indication of the possible location. Accordingly, the second data source may retrieve the set of feedback based on the indication of the possible location. For example, the second data source may extract the set of feedback from a feedback storage based on the set of feedback being associated with the possible location. The second data source may transmit, and the analysis system may receive, the statistical information in response to the request from the analysis system.

Figure 1C:
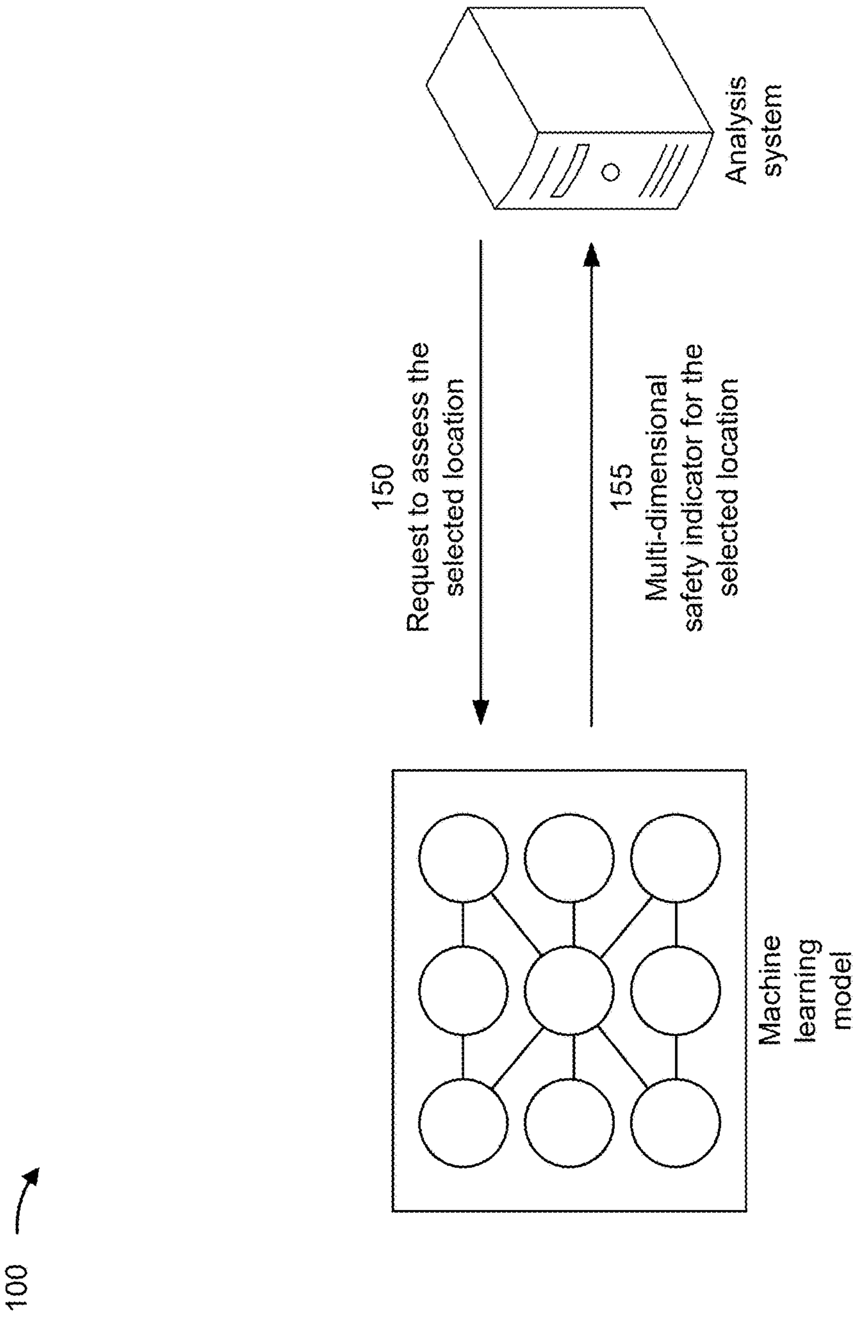

As shown in FIG. 1C, the analysis system may provide the statistical information, the set of feedback, and the background information to the ML model. For example, as shown by reference number 150, the analysis system may transmit, and the ML host (associated with the ML model) may receive, a request to assess the selected location. The ML model may be trained and applied as described in connection with FIGS. 2A-2B. The ML model may be configured to calculate a multi-dimensional safety indicator for the selected location. The multi-dimensional safety indicator may include a plurality of scores associated with a respective plurality of dimensions. The respective plurality of dimensions includes an academic dimension, a social safety dimension, and a staff safety dimension. For example, the ML model may calculate a first score (e.g., a qualitative score, such as a score out of 100, and/or a quantitative score, such as a letter grade) from the statistical information and associated with the academic dimension. Additionally, the ML model may calculate a second score, from the set of feedback, associated with the social safety dimension and may calculate a third score, from the background information, associated with the staff safety dimension.

As shown by reference number 155, the ML model may output the multi-dimensional safety indicator. For example, the ML host (associated with the ML model) may transmit, and the analysis system may receive, the multi-dimensional safety indicator (e.g., in response to the request to assess the selected location from the analysis system). In one example, the ML model may output an array (or another similar type of data structure) encoding the plurality of scores (e.g., as described above) associated with the respective plurality of dimensions.

Although the example 100 is described in connection with the analysis system gathering the statistical information, the set of feedback, and the background information, other examples may include the ML model being trained with the statistical information, the set of feedback, and the background information (e.g., because the ML host aggregates the statistical information, the set of feedback, and the background information). Therefore, the analysis system may provide an indication of the selected location to the ML model rather than the statistical information, the set of feedback, and the background information. For example, the request may include the indication of the selected location rather than the statistical information, the set of feedback, and the background information.

Figure 1D:
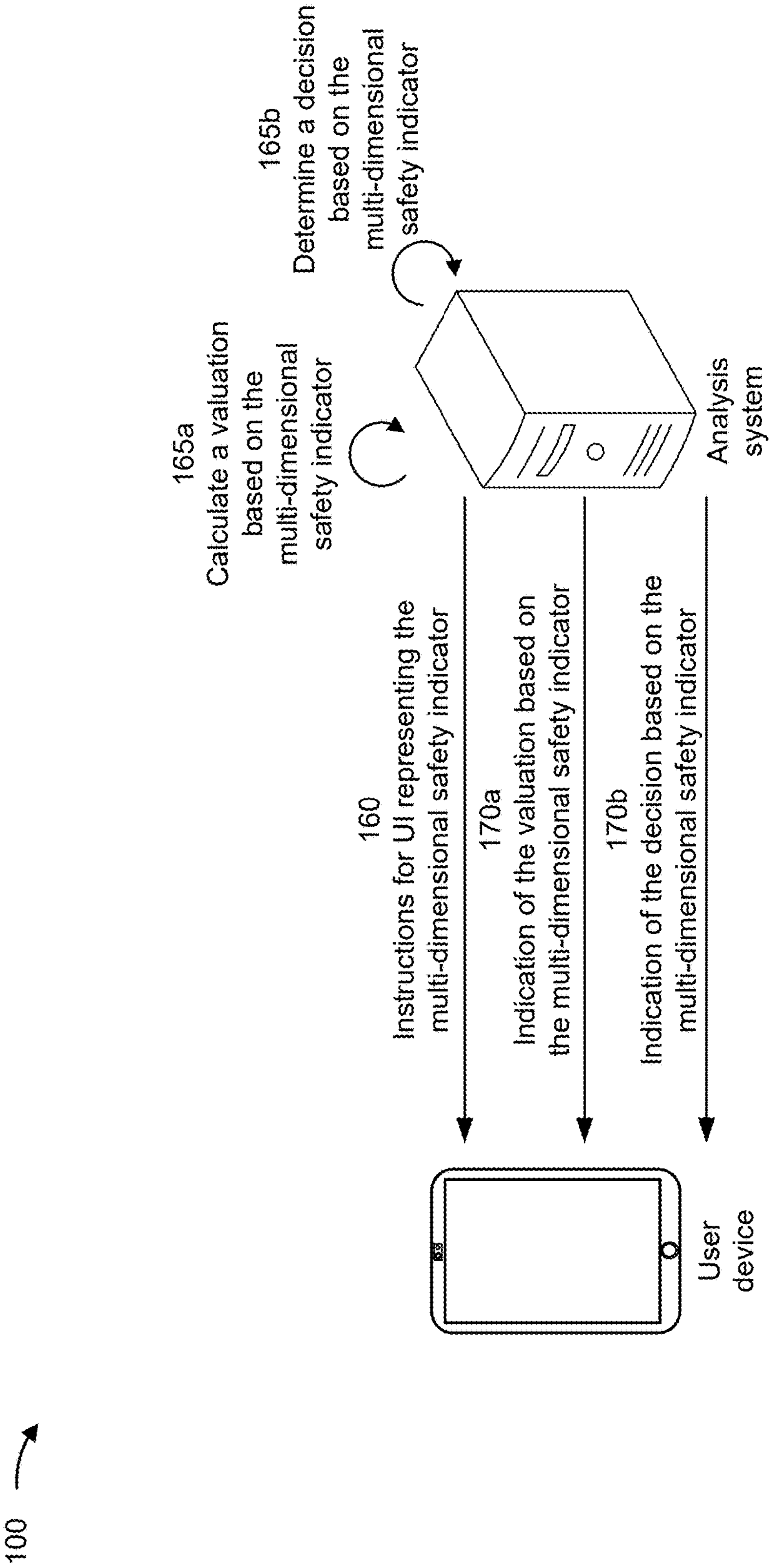

The analysis system may output a data structure encoding the multi-dimensional safety indicator. The data structure may be an array of scores, as described above. Other example data structures may include a list of scores or a class object encoding scores, among other examples. Additionally, or alternatively, as shown in FIG. 1D, the analysis may output instructions for a UI that includes a representation of the multi-dimensional safety indicator. For example, as shown by reference number 160, the analysis system may transmit, and the user device may receive, the instructions for the UI. In one example, the UI may include a bar graph, a pie chart, and/or another type of graph representing the plurality of scores, in the multi-dimensional safety indicator, along the respective plurality of dimensions. In another example, the UI may include text that encodes the multi-dimensional safety indicator, and portions of the text may be color-coded according to the plurality of scores along the respective plurality of dimensions.

In some implementations, as shown by reference number 165*a*, the analysis system may calculate a valuation for the property, at least in part, using the multi-dimensional safety indicator. For example, the analysis system may receive an initial valuation (e.g., using a valuation model or from a third-party data source, among other examples) and may adjust the initial valuation up or down based on the multi-dimensional safety indicator in order to calculate the valuation. In another example, a holistic model (e.g., a valuation model, whether local to the analysis system or provided by an ML host) may accept the multi-dimensional safety indicator as input and provide the valuation as output, where the valuation is calculated based on the multi-dimensional safety indicator in combination with other features of the property.

The analysis system may output an indication of the valuation. For example, as shown by reference number 170*a*, the analysis system may transmit, and the user device may receive, an indication of the valuation for the property based on the multi-dimensional safety indicator. In some implementations, the indication of the valuation may be included in a UI (e.g., the UI described above that represents the multi-dimensional safety indicator or a different UI). In one example, the UI may include text that encodes the valuation, and the text may be color-coded according to whether the valuation satisfies a threshold.

Additionally, or alternatively, as shown by reference number 165*b*, the analysis system may determine a decision for the property, at least in part, using the multi-dimensional safety indicator. For example, the analysis system may receive an interim decision (e.g., using a decision model or from a third-party data source, among other examples) and may retain the interim decision or change the interim decision based on the multi-dimensional safety indicator (e.g., based on whether a score, in the plurality of scores, satisfies a threshold, among other examples) in order to determine the decision. In another example, a holistic model (e.g., an underwriting model, whether local to the analysis system or provided by an ML host) may accept the multi-dimensional safety indicator as input and provide the decision as output, where the decision is calculated based on the multi-dimensional safety indicator in combination with other features of the property.

The analysis system may output an indication of the decision. For example, as shown by reference number 170*b*, the analysis system may transmit, and the user device may receive, an indication of the decision for the property based on the multi-dimensional safety indicator. In some implementations, the indication of the decision may be included in a UI (e.g., the UI described above that represents the multi-dimensional safety indicator or a different UI). In one example, the UI may include text that encodes the decision, and the text may be color-coded according to the decision (e.g., green for 'yes' and red for 'no,' among other examples).

By using techniques as described in connection with FIGS. 1A-1D, the ML model produces the multi-dimensional safety indicator. For example, the ML model may accept more input (e.g., the statistical information, the set of feedback, and the background information) in order to increase accuracy. As a result, the ML model generates more accurate output (e.g., the plurality of scores associated with the respective plurality of dimensions, such as the academic dimension, the social safety dimension, and the staff safety dimension). Additionally, the analysis system may apply the multi-dimensional safety indicator to generate to a decision associated with, and/or a valuation for, the property. As a result, the decision and/or the valuation is more accurate because the analysis system uses the multi-dimensional safety indicator from the ML model.

As indicated above, FIGS. 1A-1D are provided as an example. Other examples may differ from what is described with regard to FIGS. 1A-1D.

Figure 2A:
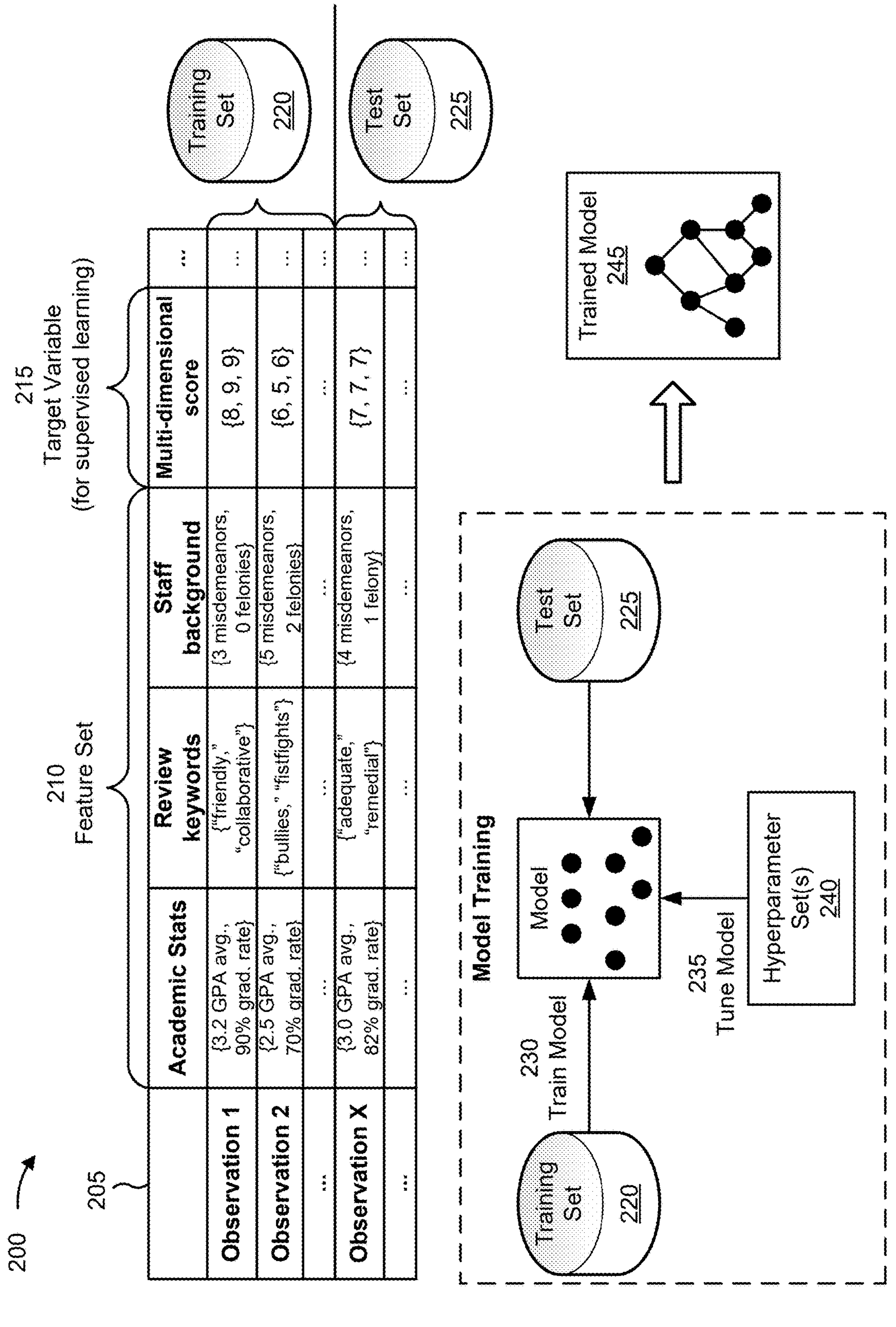
FIGS. 2A-2B are diagrams illustrating an example of training and using a machine learning model in systems and/or methods described herein, in accordance with some embodiments of the present disclosure.
Figure 2B:
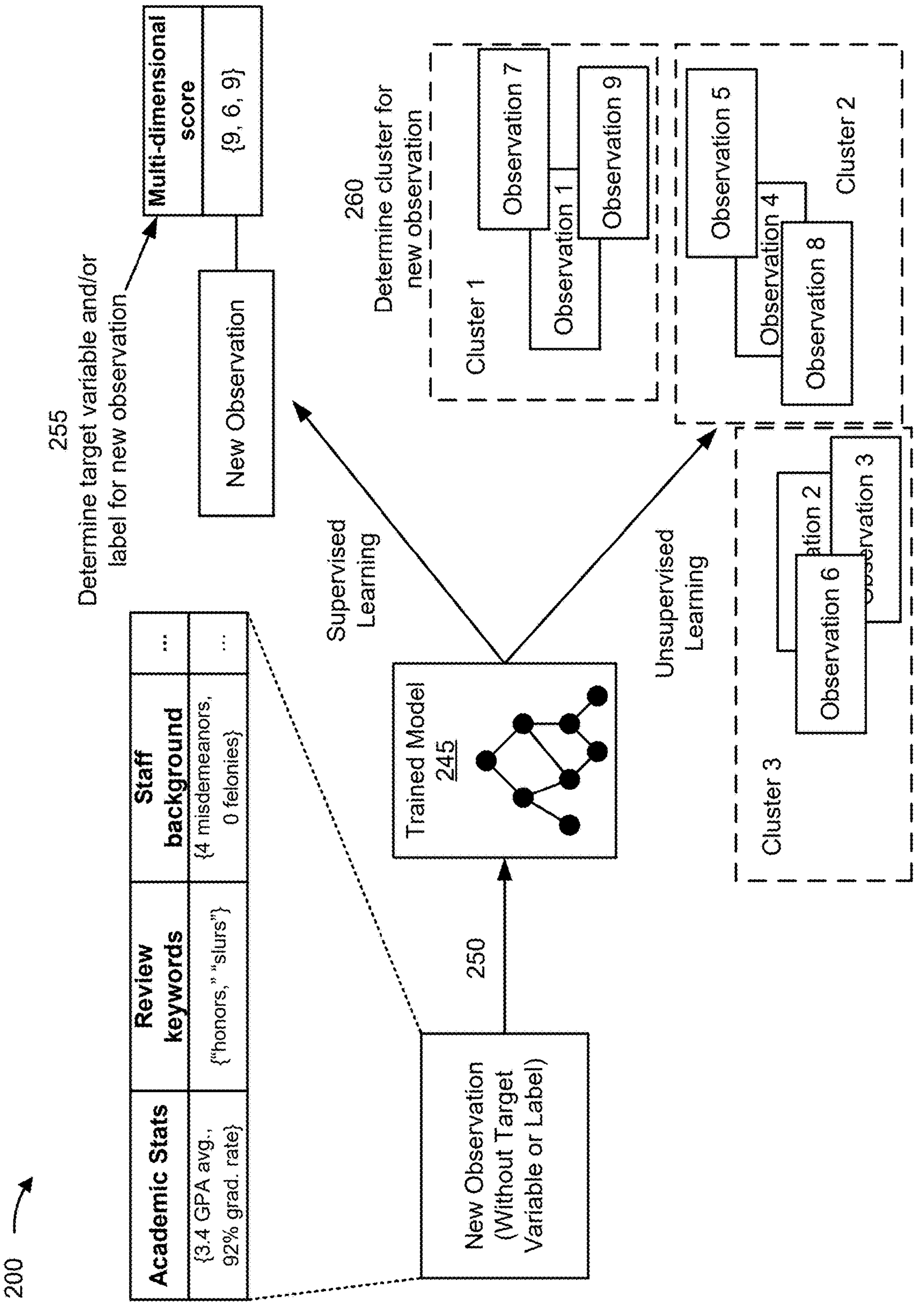

FIGS. 2A-2B are diagrams illustrating an example 200 of training and using a machine learning model as a multi-dimensional safety model. The machine learning model training described herein may be performed using a machine learning system. The machine learning system may include or may be included in a computing device, a server, a cloud computing environment, or the like, such as an analysis system or an ML host described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from data sources, as described elsewhere herein. In some implementations, the machine learning system may receive the set of observations (e.g., as input) from an administrator device.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the administrator device. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of academic statistics for a school, a second feature of keywords from reviews of the school, a third feature of staff background results for the school, and so on. As shown, for a first observation, the first feature may have a value of 3.2 grade point average (GPA) as averaged over a student body and 90% graduation rate, the second feature may have a value of "friendly" and "collaborative," the third feature may have a value of 3 misdemeanors and 0 felonies, and so on. These features and feature values are provided as examples, and may differ in other examples. For example, the feature set may include one or more of the following features: ratings from reviews (e.g., a score, a quantity of stars, or a letter grade, among other examples), police incident reports within a circumference of the school, and/or staff turnover rates, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a multi-dimensional plurality of scores, which has a value of {8, 9, 9} for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 2B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B is a diagram illustrating an example 300 of applying the trained machine learning model 245 to a new observation. As shown by reference number 250, the machine learning system may receive a new observation (or a set of new observations), and may input the new observation to the machine learning model 245. As shown, the new observation may include a first feature of a 3.4 GPA as averaged over a student body and a 92% graduation rate, a second feature of keywords including "honors" and "slurs," a third feature of background results including 4 misdemeanors and 0 felonies, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of {9, 6, 9} for the target variable of a multi-dimensional plurality of scores for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as an increased valuation or a decision to underwrite a mortgage. Additionally, or alternatively, the machine learning system may perform an automated action and/or may cause an automated action to be performed (e.g., by instructing another device to perform the automated action), such as outputting the increased valuation or triggering approval of the mortgage. As another example, if the machine learning system were to predict a value of {5, 6, 5} for the target variable of a multi-dimensional plurality of scores, then the machine learning system may provide a different recommendation (e.g., a decreased valuation or a decision to deny a mortgage) and/or may perform or cause performance of a different automated action (e.g., outputting the decreased valuation or triggering denial of the mortgage). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., associated with high quality schools), then the machine learning system may provide a first recommendation, such as an increased valuation or a decision to underwrite a mortgage. Additionally, or alternatively, the machine learning system may perform a first automated action and/or may cause a first automated action to be performed (e.g., by instructing another device to perform the automated action) based on classifying the new observation in the first cluster, such as outputting the increased valuation or triggering approval of the mortgage. As another example, if the machine learning system were to classify the new observation in a second cluster (e.g., associated with low quality schools), then the machine learning system may provide a second (e.g., different) recommendation (e.g., a decreased valuation or a decision to deny a mortgage) and/or may perform or cause performance of a second (e.g., different) automated action, such as outputting the decreased valuation or triggering denial of the mortgage.

In this way, the machine learning system may apply a rigorous and automated process to assessing schools. The machine learning system may improve accuracy as compared with using a single feature to determine a single score for the school. Additionally, the machine learning system may incorporate the multi-dimensional plurality of scores into the decision and/or the valuation described above to further increase accuracy.

As indicated above, FIGS. 2A-2B are provided as an example. Other examples may differ from what is described in connection with FIGS. 2A-2B. For example, the machine learning model may be trained using a different process than what is described in connection with FIG. 2A. Additionally, or alternatively, the machine learning model may employ a different machine learning algorithm than what is described in connection with FIGS. 2A-2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
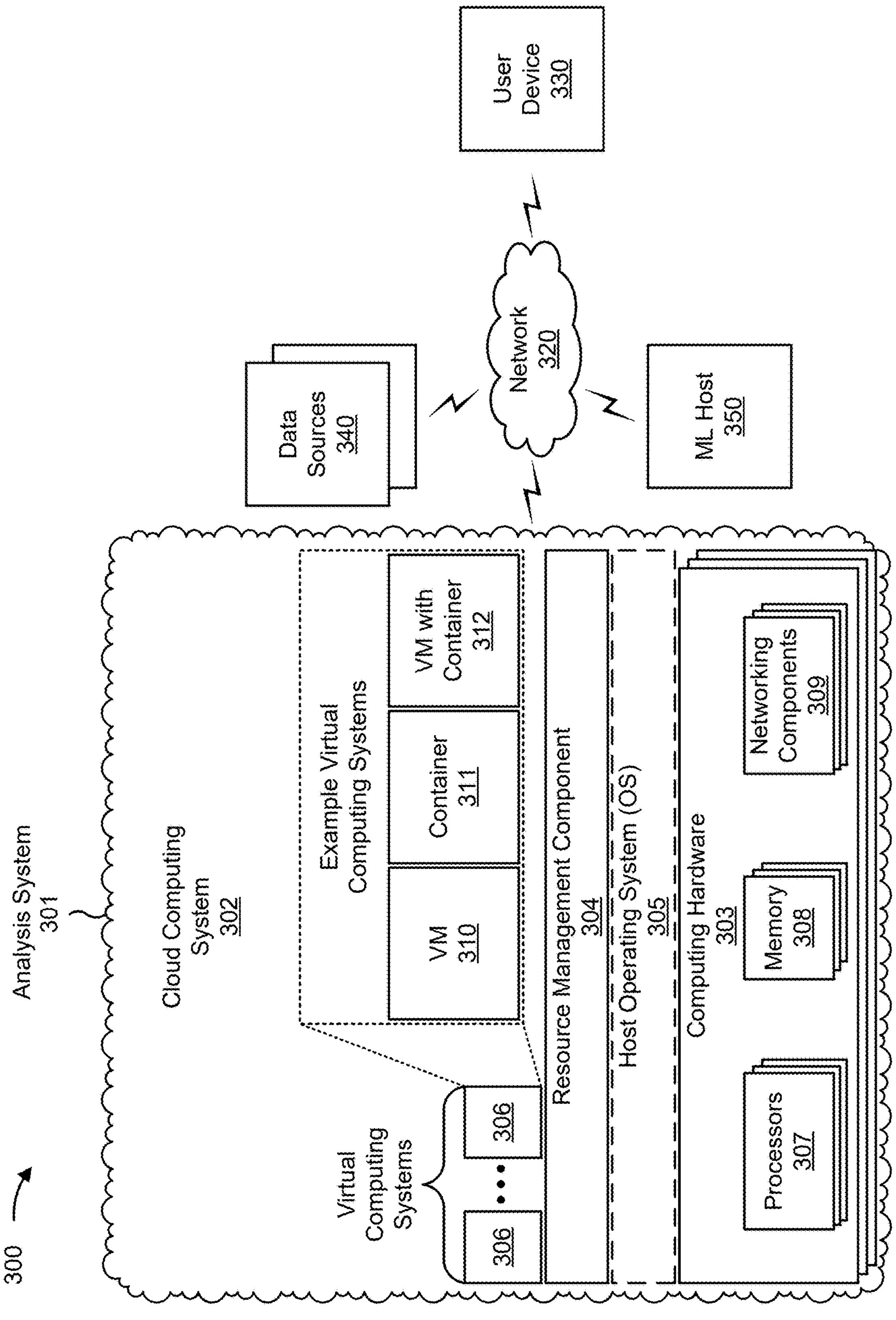
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an analysis system 301, which may include one or more elements of and/or may execute within a cloud computing system 302. The cloud computing system 302 may include one or more elements 303-312, as described in more detail below. As further shown in FIG. 3, environment 300 may include a network 320, a user device 330, a set of data sources 340, and/or an ML host 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the analysis system 301 may include one or more elements 303-312 of the cloud computing system 302, may execute within the cloud computing system 302, and/or may be hosted within the cloud computing system 302, in some implementations, the analysis system 301 may not be cloud-based (e.g., may be implemented outside of a cloud computing system) or may be partially cloud-based. For example, the analysis system 301 may include one or more devices that are not part of the cloud computing system 302, such as device 400 of FIG. 4, which may include a standalone server or another type of computing device. The analysis system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with properties, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The set of data sources 340 may include one or more devices capable of receiving, generating, storing, processing, and/or providing statistical information, feedback, and/or background information, as described elsewhere herein. The set of data sources 340 may include a communication device and/or a computing device. For example, the set of data sources 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The set of data sources 340 may communicate with one or more other devices of environment 300, as described elsewhere herein.

The ML host 350 may include one or more devices capable of receiving, generating, storing, processing, and/or providing information associated with machine learning models, as described elsewhere herein. The ML host 350 may include a communication device and/or a computing device. For example, the ML host 350 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 350 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
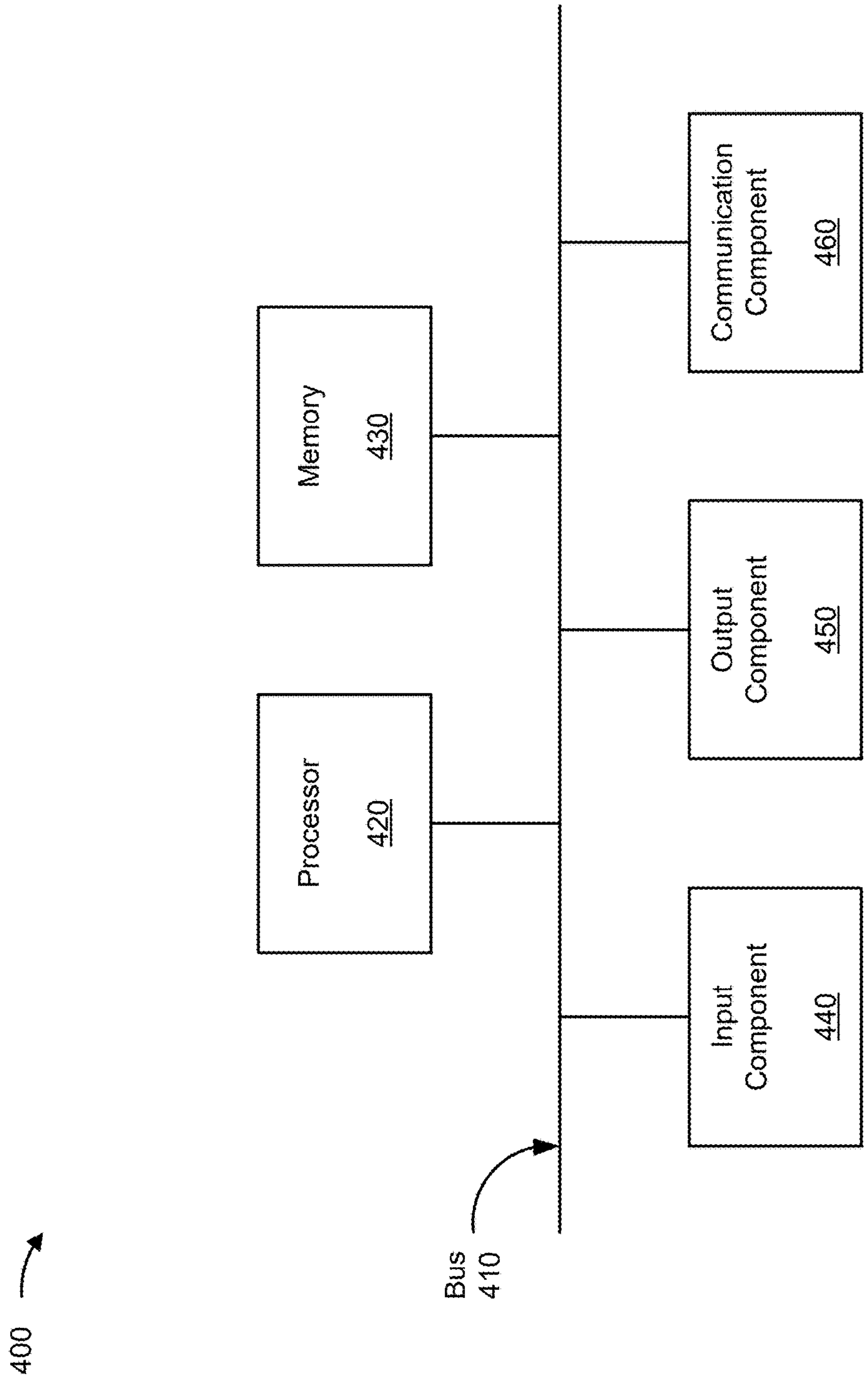
FIG. 4 is a diagram of example components of one or more devices of FIG. 3, in accordance with some embodiments of the present disclosure.

FIG. 4 is a diagram of example components of a device 400 associated with using a multi-dimensional safety model. The device 400 may correspond to a user device 330, a data source 340, and/or an ML host 350. In some implementations, a user device 330, a data source 340, and/or an ML host 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
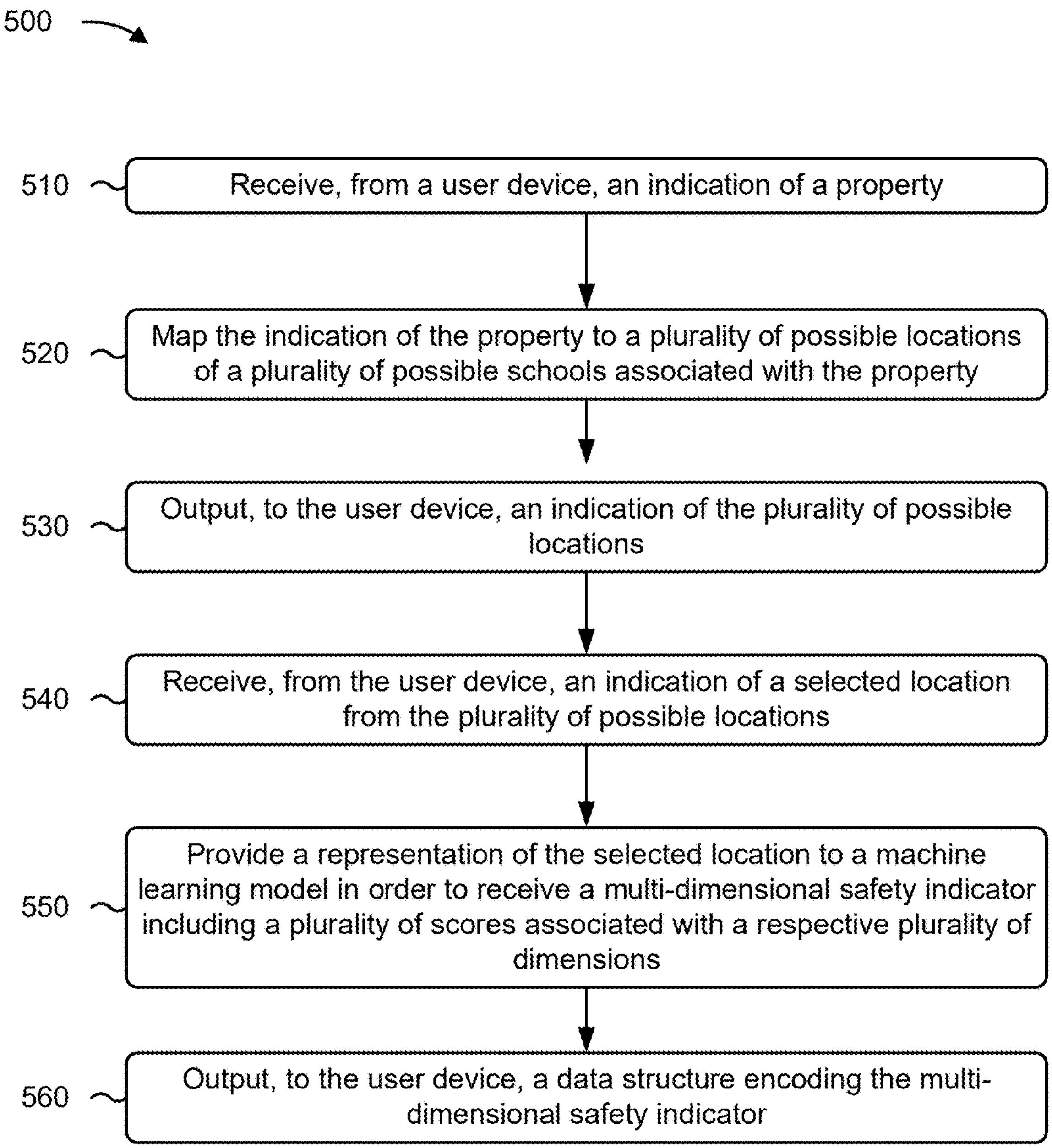
FIG. 5 is a flowchart of an example process relating to applying a multi-dimensional safety model, in accordance with some embodiments of the present disclosure.

FIG. 5 is a flowchart of an example process 500 associated with applying a multi-dimensional safety model. In some implementations, one or more process blocks of FIG. 5 may be performed by an analysis system 301. In some implementations, one or more process blocks of FIG. 5 may be performed by another device or a group of devices separate from or including the analysis system 301, such as a user device 330, a data source 340, and/or an ML host 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, from a user device, an indication of a property (block 510). For example, the analysis system 301 (e.g., using processor 420, memory 430, and/or communication component 460) may receive, from a user device, an indication of a property, as described above in connection with reference number 110 of FIG. 1A. As an example, the indication of the property may be based on a map (e.g., output by the analysis system 301). Additionally, or alternatively, the indication of the property may be an address and/or a set of coordinates (e.g., using a GCS or another type of coordinate system), among other examples.

As further shown in FIG. 5, process 500 may include mapping the indication of the property to a plurality of possible locations of a plurality of possible schools associated with the property (block 520). For example, the analysis system 301 (e.g., using processor 420, memory 430, and/or communication component 460) may map the indication of the property to a plurality of possible locations of a plurality of possible schools associated with the property, as described above in connection with reference number 115 of FIG. 1A. As an example, the analysis system 301 may use a data structure that stores property indications in association with possible location indications (of possible schools). Additionally, or alternatively, the analysis system 301 may transmit a query, indicating the location of the property, to a database, and the analysis system 301 may receive a response, to the query, indicating the plurality of possible locations.

As further shown in FIG. 5, process 500 may include outputting, to the user device, an indication of the plurality of possible locations (block 530). For example, the analysis system 301 (e.g., using processor 420, memory 430, and/or communication component 460) may output, to the user device, an indication of the plurality of possible locations, as described above in connection with reference number 120 of FIG. 1A. As an example, the analysis system 301 may transmit, to the user device, instructions for a UI indicating the plurality of possible locations. The UI may include a drop-down list, a listbox, or a set of radio buttons, among other examples, that indicate the plurality of possible locations.

As further shown in FIG. 5, process 500 may include receiving, from the user device, an indication of a selected location from the plurality of possible locations (block 540). For example, the analysis system 301 (e.g., using processor 420, memory 430, and/or communication component 460) may receive, from the user device, an indication of a selected location from the plurality of possible locations, as described above in connection with reference number 125 of FIG. 1A. As an example, the analysis system 301 may receive the indication of the selected location based on an interaction with the UI indicating the plurality of possible locations.

As further shown in FIG. 5, process 500 may include providing a representation of the selected location to a machine learning model in order to receive a multi-dimensional safety indicator including a plurality of scores associated with a respective plurality of dimensions (block 550). For example, the analysis system 301 (e.g., using processor 420, memory 430, and/or communication component 460) may provide a representation of the selected location to a machine learning model in order to receive a multi-dimensional safety indicator including a plurality of scores associated with a respective plurality of dimensions, as described above in connection with FIG. 1C. As an example, the machine learning model may be configured to calculate a multi-dimensional safety indicator for the selected location (e.g., as described in connection with FIGS. 2A-2B). The respective plurality of dimensions includes an academic dimension, a social safety dimension, and a staff safety dimension. For example, the machine learning model may calculate a first score (e.g., a qualitative score, such as a score out of 100, and/or a quantitative score, such as a letter grade) from the statistical information and associated with the academic dimension. Additionally, the machine learning model may calculate a second score, from the set of feedback, associated with the social safety dimension and may calculate a third score, from the background information, associated with the staff safety dimension.

As further shown in FIG. 5, process 500 may include outputting, to the user device, a data structure encoding the multi-dimensional safety indicator (block 560). For example, the analysis system 301 (e.g., using processor 420, memory 430, and/or communication component 460) may output, to the user device, a data structure encoding the multi-dimensional safety indicator, as described above in connection with FIG. 1D. As an example, the data structure may be an array, a list, or a class object, among other examples. Additionally, or alternatively, the analysis system 301 may transmit, to the user device, instructions for a UI indicating the multi-dimensional safety indicator. In one example, the UI may include a bar graph, a pie chart, and/or another type of graph representing the plurality of scores, in the multi-dimensional safety indicator, along the respective plurality of dimensions. In another example, the UI may include text that encodes the multi-dimensional safety indicator, and portions of the text may be color-coded according to the plurality of scores along the respective plurality of dimensions.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and/or FIGS. 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
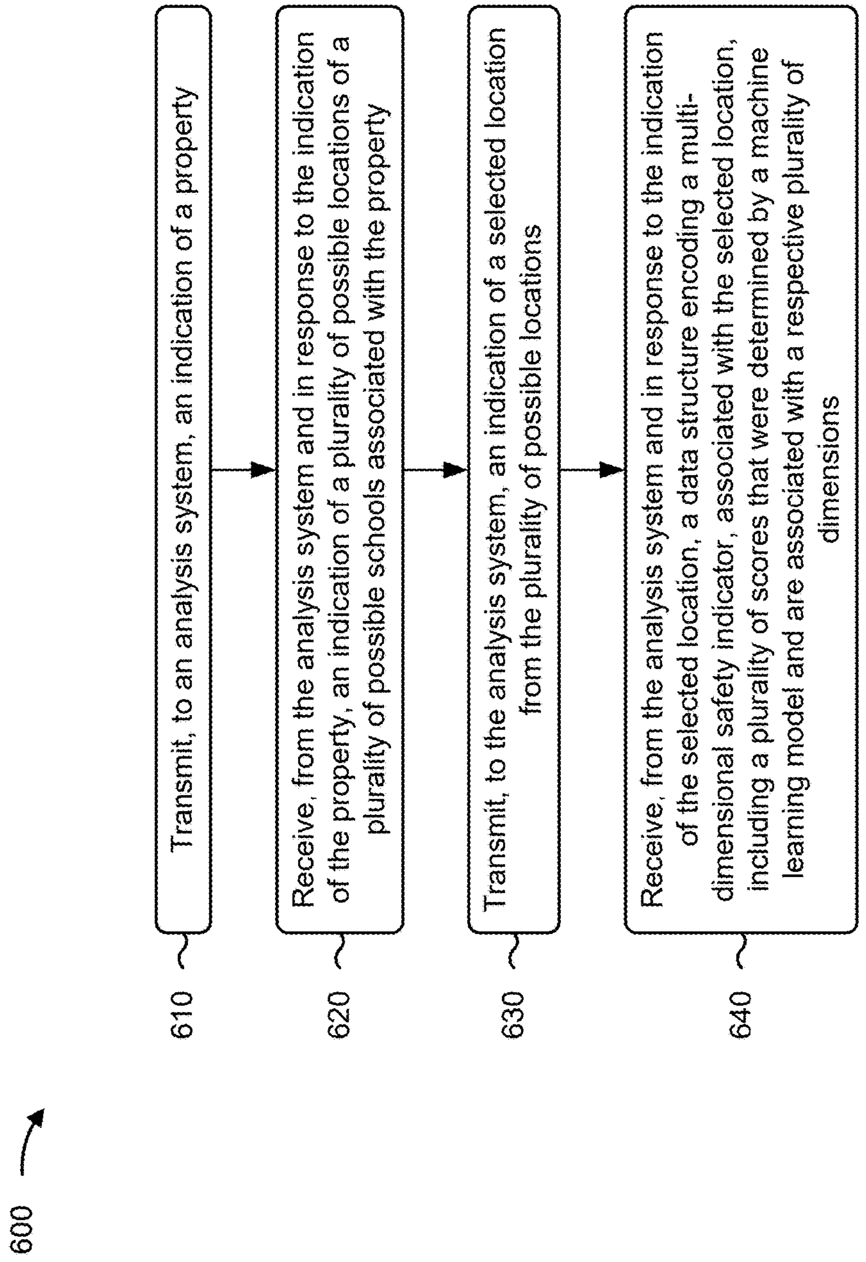
FIG. 6 is a flowchart of an example process relating to receiving output from a multi-dimensional safety model, in accordance with some embodiments of the present disclosure.

FIG. 6 is a flowchart of an example process 600 associated with receiving output from a multi-dimensional safety model. In some implementations, one or more process blocks of FIG. 6 may be performed by a user device 330. In some implementations, one or more process blocks of FIG. 6 may be performed by another device or a group of devices separate from or including the user device 330, such as an analysis system 301, a data source 340, and/or an ML host 350. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include transmitting, to an analysis system, an indication of a property (block 610). For example, the user device 330 (e.g., using processor 420, memory 430, and/or communication component 460) may transmit, to an analysis system, an indication of a property, as described above in connection with reference number 110 of FIG. 1A. As an example, the user device 330 may detect an interaction (e.g., using input component 440) with a representation of a map. Accordingly, the user device 330 may transmit the indication of the property based on the interaction. Additionally, or alternatively, the indication of the property may be an address and/or a set of coordinates (e.g., using a GCS or another type of coordinate system), among other examples.

As further shown in FIG. 6, process 600 may include receiving, from the analysis system and in response to the indication of the property, an indication of a plurality of possible locations of a plurality of possible schools associated with the property (block 620). For example, the user device 330 (e.g., using processor 420, memory 430, and/or communication component 460) may receive, from the analysis system and in response to the indication of the property, an indication of a plurality of possible locations of a plurality of possible schools associated with the property, as described above in connection with reference number 120 of FIG. 1A. As an example, the user device 330 may receive, from the analysis system, instructions for a UI indicating the plurality of possible locations. The user device may therefore output the UI (e.g., via output component 450). The UI may include a drop-down list, a listbox, or a set of radio buttons, among other examples.

As further shown in FIG. 6, process 600 may include transmitting, to the analysis system, an indication of a selected location from the plurality of possible locations (block 630). For example, the user device 330 (e.g., using processor 420, memory 430, and/or communication component 460) may transmit, to the analysis system, an indication of a selected location from the plurality of possible locations, as described above in connection with reference number 125 of FIG. 1A. As an example, the user device 330 may detect an interaction (e.g., using input component 440) with the UI indicating the plurality of possible locations. Accordingly, the user device 330 may transmit the indication of the selected location based on the interaction.

As further shown in FIG. 6, process 600 may include receiving, from the analysis system and in response to the indication of the selected location, a data structure encoding a multi-dimensional safety indicator, associated with the selected location, including a plurality of scores that were determined by a machine learning model and are associated with a respective plurality of dimensions (block 640). For example, the user device 330 (e.g., using processor 420, memory 430, and/or communication component 460) may receive, from the analysis system and in response to the indication of the selected location, a data structure encoding a multi-dimensional safety indicator, associated with the selected location, including a plurality of scores that were determined by a machine learning model and are associated with a respective plurality of dimensions, as described above in connection with FIG. 1D. As an example, the data structure may be an array, a list, or a class object, among other examples. Additionally, or alternatively, the user device 330 may receive, from the analysis system, instructions for a UI indicating the multi-dimensional safety indicator. In one example, the UI may include a bar graph, a pie chart, and/or another type of graph representing the plurality of scores, in the multi-dimensional safety indicator, along the respective plurality of dimensions. In another example, the UI may include text that encodes the multi-dimensional safety indicator, and portions of the text may be color-coded according to the plurality of scores along the respective plurality of dimensions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1D. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for using a machine learning model to determine a multi-dimensional safety indicator, the system comprising:

one or more memories; and one or more processors, communicatively coupled to the one or more memories, configured to:

receive, from a user device, an indication of a property;

determine, using the indication of the property, a location of a school associated with the property;

receive, from a first data source, statistical information associated with the location;

receive, from a second data source, a set of feedback associated with the location;

verify information associated with the set of feedback based on:

transmitting, to a database, a query indicating a set of sources associated with the set of feedback; and receiving, from the database, a response indicating that the set of sources are verified;

receive, from a third data source, background information associated with a set of staff for the location;

provide the statistical information, the set of feedback, and the background information to the machine learning model in order to receive the multi-dimensional safety indicator, wherein the multi-dimensional safety indicator comprises a plurality of scores associated with a respective plurality of dimensions, wherein the machine learning model is trained using a cross-validation technique comprising:

splitting a training set into a number of groups including a hold-out group and a training group; and training the machine learning model on the training group and then testing the machine learning model on the hold-out group to generate a cross-validation score; and output, to the user device, instructions for a user interface (UI) including a representation of the multi-dimensional safety indicator.

2. The system of claim 1, wherein the one or more processors are configured to:

output, to the user device, instructions for a map of a geographic area that includes the property, wherein the indication of the property comprises an indication of an interaction with the map.

3. The system of claim 1, wherein the indication of the property comprises an address or a set of coordinates.

4. The system of claim 1, wherein the one or more processors, to determine the location of the school, are configured to:

map, using a data structure, a location of the property to the location of the school.

5. The system of claim 4, wherein the one or more processors, to map the location of the property to the location of the school, are configured to:

transmit, to a database, a query indicating the location of the property; and receive, from the database, a response indicating the location of the school.

6. The system of claim 1, wherein each feedback, in the set of feedback, includes an indication of verification for a corresponding source in the set of verified sources.

7. The system of claim 1, wherein the UI further indicates a valuation for the property that was calculated, at least in part, using the multi-dimensional safety indicator.

8. The system of claim 1, wherein the UI includes text that encodes the multi-dimensional safety indicator, and wherein the one or more processors are configured to:

color-code portions of the text based on the plurality of scores along the respective plurality of dimensions.

9. A method of using a machine learning model to determine a multi-dimensional safety indicator, comprising:

receiving, at an analysis system and from a user device, an indication of a property;

mapping, by the analysis system, the indication of the property to a plurality of possible locations of a plurality of possible schools associated with the property;

outputting, from the analysis system and to the user device, an indication of the plurality of possible locations;

receiving, at the analysis system and from the user device, an indication of a selected location from the plurality of possible locations;

receiving, from a data source, a set of feedback associated with the selected location;

verifying information associated with the set of feedback based on:

transmitting, to a database, a query indicating a set of sources associated with the set of feedback; and receiving, from the database, a response indicating that the set of sources are verified;

providing a representation of the selected location to the machine learning model in order to receive the multi-dimensional safety indicator, wherein the multi-dimensional safety indicator comprises a plurality of scores associated with a respective plurality of dimensions, wherein the machine learning model is trained using a cross-validation technique comprising:

splitting a training set into a number of groups including a hold-out group and a training group; and training the machine learning model on the training group and then testing the machine learning model on the hold-out group to generate a cross-validation score; and outputting, from the analysis system and to the user device, a data structure encoding the multi-dimensional safety indicator.

10. The method of claim 9, wherein outputting the indication of the plurality of possible locations comprises:

transmitting, from the analysis system and to the user device, instructions for a user interface (UI) indicating the plurality of possible locations.

11. The method of claim 10, wherein receiving the indication of the selected location comprises:

receiving an indication of an interaction with the UI, wherein the indication of the interaction comprises the indication of the selected location.

12. The method of claim 9, further comprising:

outputting, from the analysis system and to the user device, an indication of a valuation for the property that was calculated, at least in part, using the multi-dimensional safety indicator.

13. The method of claim 9, wherein the data structure encoding the multi-dimensional safety indicator comprises an array of scores.

14. The method of claim 9, wherein the respective plurality of dimensions includes an academic dimension, a social safety dimension, and a staff safety dimension.

15. A non-transitory computer-readable medium storing a set of instructions for receiving a multi-dimensional safety indicator determined by a machine learning model, the set of instructions comprising:

one or more instructions that, when executed by one or more processors of a device, cause the device to:

transmit, to an analysis system, an indication of a property;

receive, from the analysis system and in response to the indication of the property, an indication of a plurality of possible locations of a plurality of possible schools associated with the property;

transmit, to the analysis system, an indication of a selected location from the plurality of possible locations; and receive, from the analysis system and in response to the indication of the selected location, a data structure encoding the multi-dimensional safety indicator associated with the selected location, wherein the multi-dimensional safety indicator comprises a plurality of scores that were determined by the machine learning model and are associated with a respective plurality of dimensions, wherein information associated with a set of feedback associated with the selected location was verified based on:

transmitting, to a database, a query indicating a set of sources associated with the set of feedback; and receiving, from the database, a response indicating that the set of sources are verified;

wherein a representation of the selected location is provided to the machine learning model in order to receive the data structure encoding the multi-dimensional safety indicator, wherein the machine learning model is trained using a cross-validation technique comprising:

splitting a training set into a number of groups including a hold-out group and a training group; and training the machine learning model on the training group and then testing the machine learning model on the hold-out group to generate a cross-validation score.

16. The non-transitory computer-readable medium of claim 15, wherein the one or more instructions, when executed by the one or more processors, cause the device to:

output a representation of a map to a user of the device; and detect an interaction with the representation of the map by the user of the device, wherein the indication of the property is transmitted based on the interaction.

17. The non-transitory computer-readable medium of claim 15, wherein the one or more instructions, when executed by the one or more processors, cause the device to:

output a representation of the plurality of possible locations to a user of the device; and detect an interaction with the representation of the plurality of possible locations from the user of the device, wherein the indication of the selected location is transmitted based on the interaction.

18. The non-transitory computer-readable medium of claim 15, wherein the respective plurality of dimensions includes an academic dimension, a social safety dimension, and a staff safety dimension.

19. The non-transitory computer-readable medium of claim 15, wherein the one or more instructions, when executed by the one or more processors, cause the device to:

receive, from the analysis system, a decision associated with the property that was determined, at least in part, using the multi-dimensional safety indicator.

20. The non-transitory computer-readable medium of claim 15, wherein the one or more instructions, when executed by the one or more processors, cause the device to:

receive, from the analysis system, an indication of a valuation for the property that was calculated, at least in part, using the multi-dimensional safety indicator.

* * * * *